United States Patent [19]
James

[11] 3,828,443
[45] Aug. 13, 1974

[54] LINE SQUARE
[75] Inventor: Russell P. James, Avon Park, Fla.
[73] Assignees: Thomas W. Bagwill; James A. Heim, both of Avon Park, Fla. ; part interest to each
[22] Filed: June 20, 1972
[21] Appl. No.: 264,438

[52] U.S. Cl................. 33/227, 33/1 LE, 33/282, 33/285, 33/299
[51] Int. Cl............................................. G01c 1/00
[58] Field of Search ............ 33/227, 228, 299, 263, 33/286, 285, 282, 1 LE

[56] References Cited
UNITED STATES PATENTS
| | | | |
|---|---|---|---|
| 1,018,150 | 2/1912 | Adams | 33/285 |
| 1,401,200 | 12/1921 | Smith | 33/285 |

FOREIGN PATENTS OR APPLICATIONS
| | | | |
|---|---|---|---|
| 260,664 | 10/1928 | Italy | 33/282 |
| 64,471 | 4/1914 | Austria | 33/285 |
| 865,597 | 2/1953 | Germany | 33/373 |
| 805,070 | 8/1936 | France | 33/285 |

*Primary Examiner*—Louis R. Prince
*Assistant Examiner*—Richard R. Stearns
*Attorney, Agent, or Firm*—Berman, Bishoff & Platt

[57] ABSTRACT

A line square for laying out a building; for a permanent lay out reference for large constructions of the type which require a considerable period of time such as bridges and piling work; for a factory machinery layout; for a grocery store, shelves and aisles layout; and for measuring inaccessible objects such as Stone Mountain illustrations and the like. A reference line is drawn taut across the area to be aligned, and an instrument support member is hand held on the line in alignment therewith. A theodolite, transit, or a simple angularly adjustable telescope is supported on the instrument support for movement along the line to align the instrument at any desired transverse angle to the line. The line may run horizontally, angularly, or vertically, as desired.

10 Claims, 9 Drawing Figures

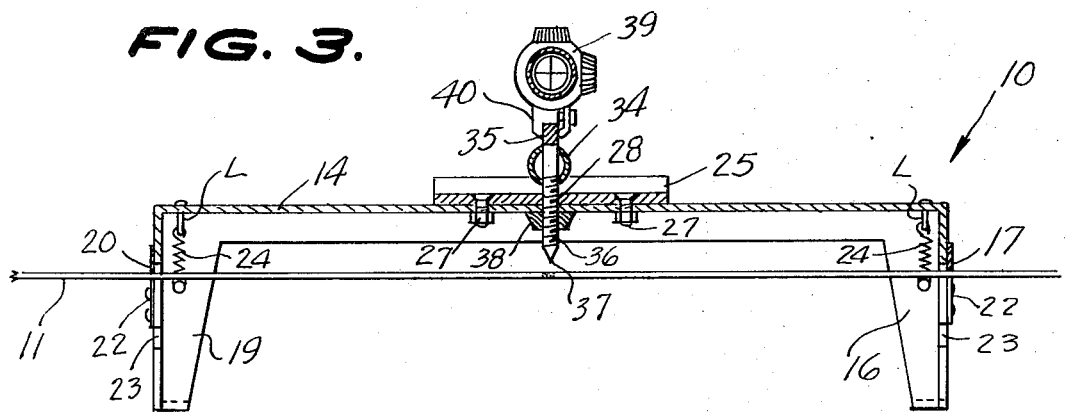
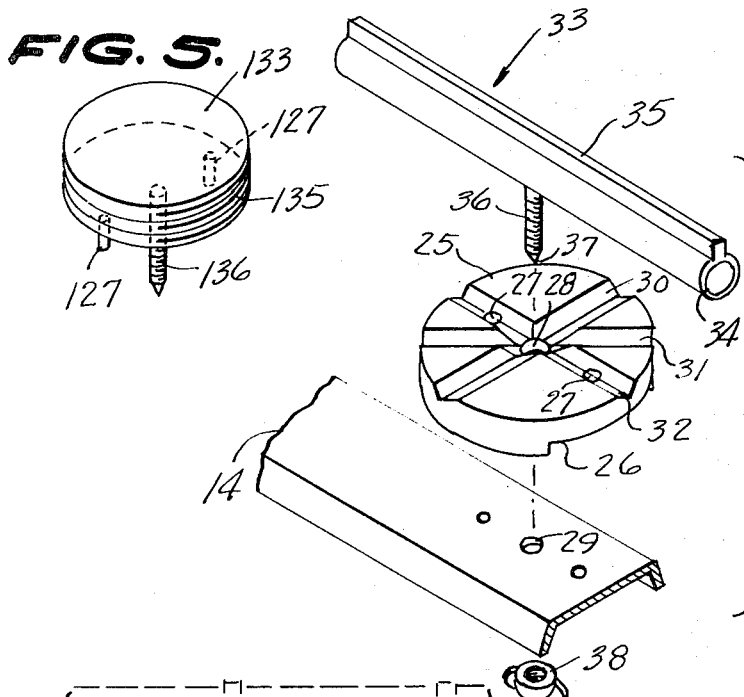
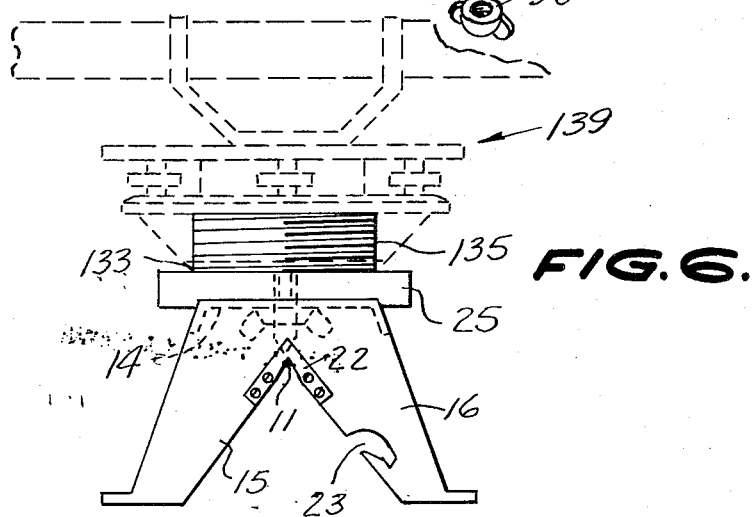

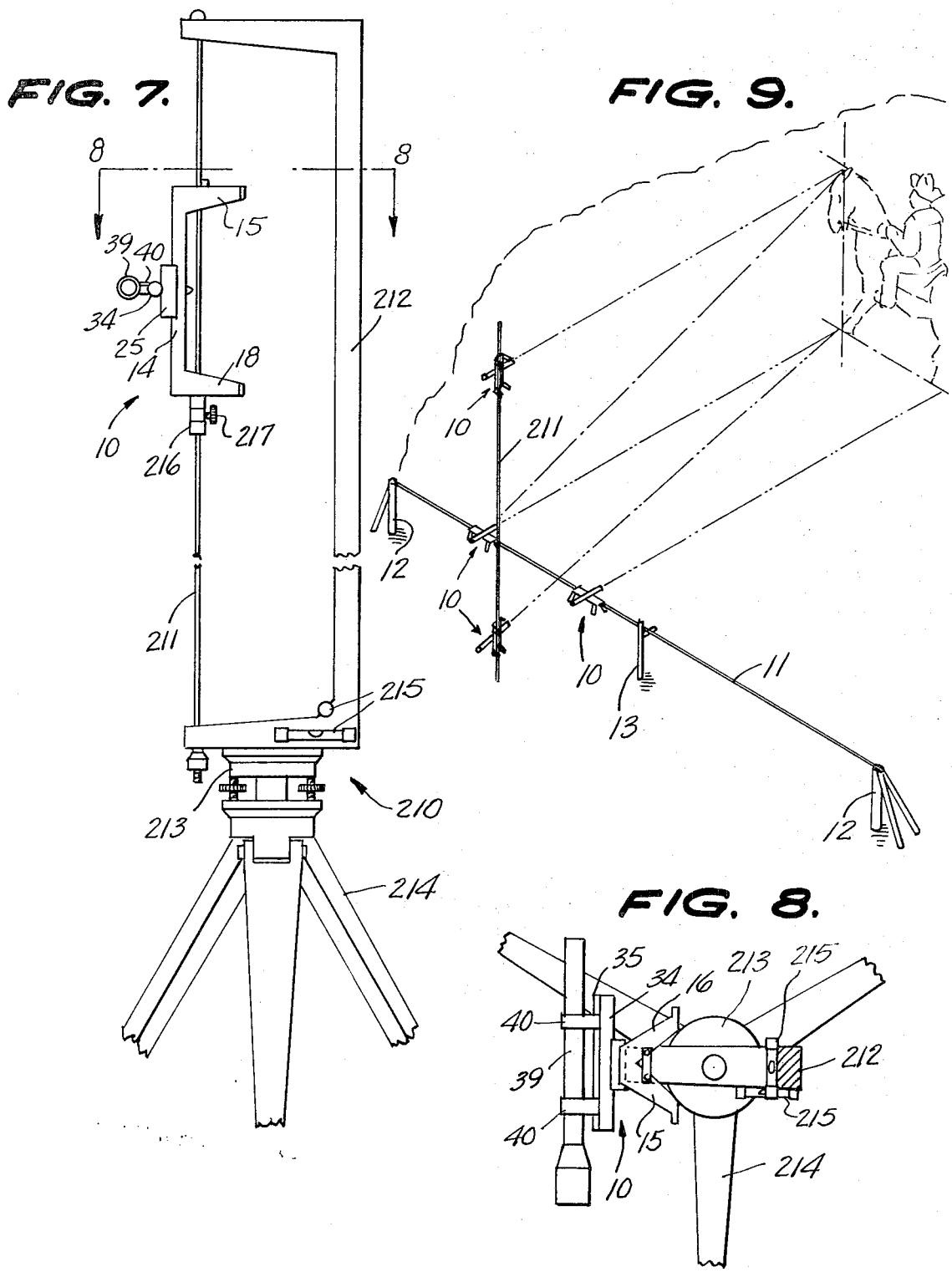

LINE SQUARE

BACKGROUND OF THE INVENTION

Field of the Invention

The present invention relates to line squares for use in structural layout work.

SUMMARY OF THE INVENTION

A reference layout line is drawn taut either horizontally, angularly, or vertically adjacent the work to be aligned and supports a hand held instrument support arranged in aligned relation thereto. An instrument such as a theodolite, transit or a simple telescope angularly, adjustably mounted on the support is used for aligning the work at any desired angle to the line. The instrument support can be slid along the line as required.

The primary object of the invention is to provide a line square for angularly aligning work.

Other objects and advantages will become apparent in the following specification when considered in light of the attached drawings.

BRIEF DESCRIPTION OF THE DRAWINGS

FIG. 3 is a longitudinal sectional view taken along the line 3—3 of FIG. 2 looking in the direction of the arrows;

FIG. 4 is an exploded perspective view of the telescope support;

FIG. 5 is a perspective view of the transit support;

FIG. 6 is an end elevation of the invention with the transit support positioned thereon;

FIG. 7 is a side elevation of the invention used with a modified line support with a line in a vertical position;

FIG. 8 is a horizontal sectional view taken along the line 8—8 of FIG. 7 looking in the direction of the arrows; and FIG. 9 is a perspective view of the instrument in use with a horizontal and a vertical wire for measuring distant objects.

DESCRIPTION OF THE PREFERRED EMBODIMENTS

Figure 1:
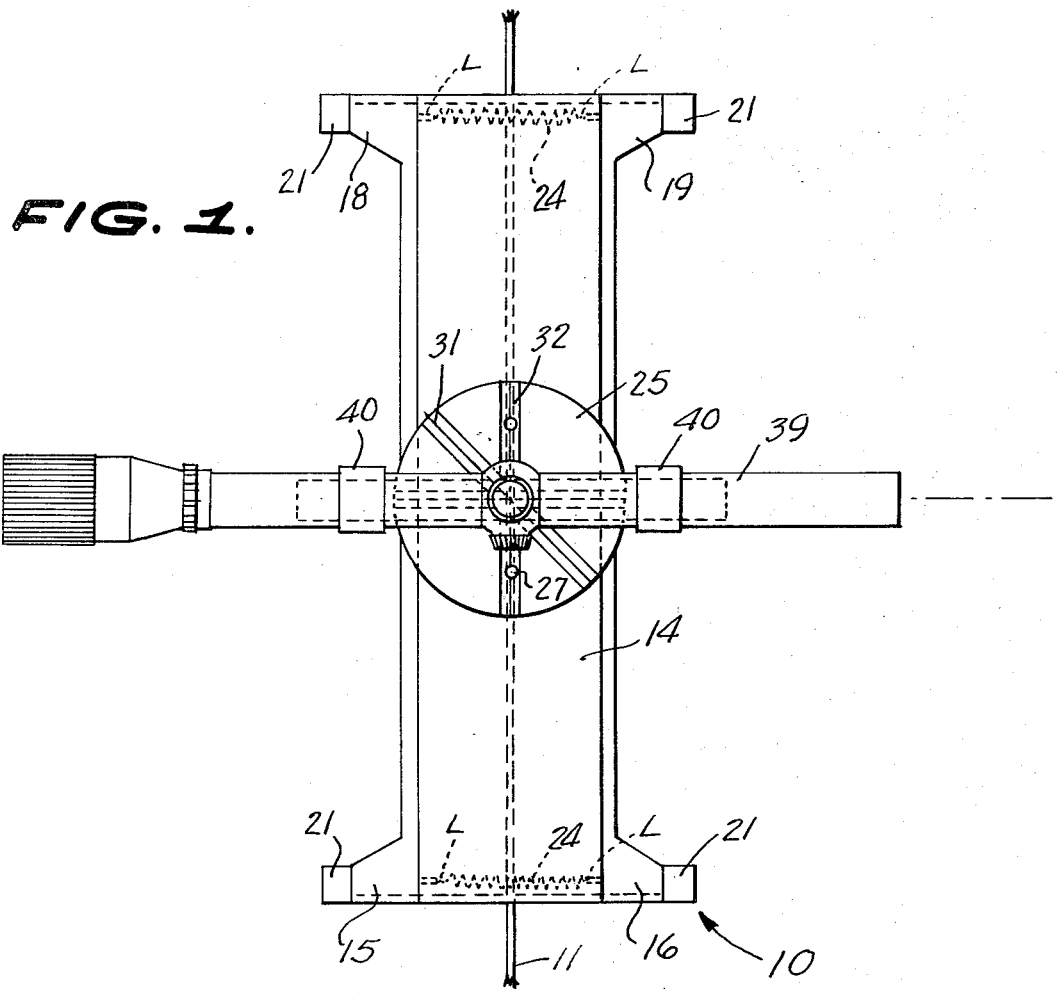
FIG. 1 is a top plan view of the invention.

Referring now to the drawings in detail wherein like reference characters indicate like parts throughout the several figures, the reference numeral 10 indicates generally a line square constructed in accordance with the invention.

The line square 10 is adapted for use with a guide line or wire 11 which is pulled taut and supported in a generally horizontal plane on a pair of posts 12 to which the opposite ends of the wire 11 are attached. In some instances, the span of the wire 11 is such that an intermediate post 13 is used to support the wire 11.

The line square 10 includes a generally horizontal channel member 14 having a pair of legs 15, 16 integrally formed on one end thereof and depending therefrom to form a V-shaped guide notch 17. The center of the V-shaped guide notch 17 aligns with the center of the channel member 14. A second pair of legs 18, 19 are integrally formed at the opposite end of the channel member 14 and are similarly provided with a V-shaped guide notch 20 which also aligns with the longitudinal center of the channel member 14.

The legs 15, 16, 18 and 19 are each provided with a generally horizontally extending foot 21 for supporting the line square 10 on a supporting surface, for storage, and the like.

A generally V-shaped guide plate 22 is secured to each of the pair of legs 15, 16 and the pair of legs 18, 19 to engage the wire 11 and to provide a bearing surface between the square 10 and the wire 11. The V-shaped guide members 22 may be replaced when worn.

Figure 2:
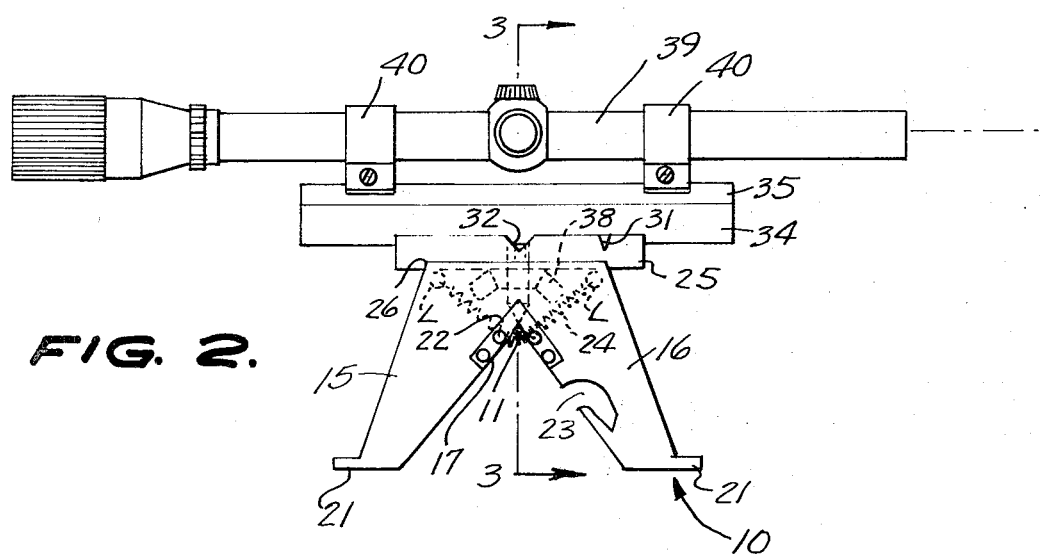
FIG. 2 is an end elevation of the invention.

The legs 16, 19 are provided with L-shaped notches 23 to hang the square 10 from the wire 11 when out of use. A coil spring 24 has its opposite ends detachably secured to loops L secured to the underside of each end of the channel member 14. The springs 24 engage under the wire 11 as can be seen clearly in FIG. 2. The coil springs 24 assist in holding the square 10 tightly to the wire 11 so that the square 10 is aligned with the wire 11.

A circular alignment plate 25 has a notch 26 formed in its lower surface for engaging over the top of the channel member 14 in aligned relation thereto. A pair of bolts 27 extend through the plate 25 and through the channel member 14 to rigidly secure the plate 25 to the channel member 14. A bore 28 opens axially through the plate 25 and is aligned with a bore 29 in the channel member 14. The plate 25 has a plurality of diametrically extending V-grooves 30, 31 and 32 formed in the upper face thereof. The groove 30 extends perpendicularly to the groove 32, and the groove 31 is positioned intermediate the grooves 30, 32 to form a 45° angle thereto.

A telescope support indicated generally at 33 includes an elongated tube 34 having a generally rectangular bar 35 integrally secured thereto. A threaded bolt 36 is rigidly secured to the tube 34 and depends perpendicularly therefrom. The bolt 36 has a pointer end 37 for aligning with the wire 11. The bolt 36 engages through the bore 28 and the bore 29 and is secured to the channel member 14 by a wing nut 38. The tube 34 is engaged in a selected one of the V-notches 30, 31 or 32 so as to establish the angle of the bar 35 with respect to the wire 11. A telescopic sight 39 is secured to the bar 35 by a pair of clamps 40.

The sight 39 is of conventional construction and is of the type normally used on a rifle for target and long distance shooting.

In the use and operation of the invention, the wire 11 is positioned adjacent the area to be laid out or measured as seen in FIG. 9, and the line square 10 is positioned on the wire 11 with the sight 39 set at right angles to the wire 11. The desired alignment of the layout can then be made by viewing through the sight 39 and moving the line square 10 along the wire 11 until it is in the desired position. After the square 10 has been positioned, it may then be used for aligning desired points along a line perpendicular to the line 11. By using the groove 31 points along a line at 45° to the line 11 may also be established. Measurements between any two points at a distance can be made by first aligning the sight 39 on one point and them moving it along the wire parallel to the points being measured, and then aligning it with the second spot, and subsequently measuring the distance between the two spots along the wire.

In FIGS. 5 and 6, a modified form of the invention is illustrated wherein a generally cylindrical support 133 has an externally threaded surface 135 and an axial bolt 136 extending through the bore 28 and the bore 29 to be secured to the channel member 14 by the wing nut 38. Dogs 127 engage in any one of the notches 30, 31, 32 to lock the support 133 against rotation with respect to the plate 25. In the modified form of the invention illustated in FIGS. 5 and 6, the channel member 14, legs 15, 16, angle guide member 22, and hanging notch 23 are all constructed identically to the preferred form of the invention. The channel member 14 in the modified form of the invention also is provided with legs 18, 19 (not shown in FIG. 6). A transit generally indicated at 139 is threaded onto the threads 135 on the support 133 and is locked thereon. The transit 139 is then used in the conventional manner and can be swung to any desired degree with respect to the wire 11 and can also be swung through a vertical plane to measure angles from the horizontal.

The form of the invention illustrated in FIGS. 5 and 6 is a refined modification of the invention illustrated in FIGS. 1–4 and permits a greater control of accuracy of the layout.

In FIGS. 7 and 8, a modified alignment support is indicated generally at 210 and includes a wire 211 extending vertically across the open side of a yoke 212. The yoke 212 is supported on a transit base 213 carried by a tripod 214. The yoke 212 is provided with transverse and longitudinal levels 215 to permit the wire 211 to be positioned vertically.

The use and operation of the modification illustrated in FIGS. 7 and 8 is identical to that of the preferred form of the invention with the exception that the line square 10 is moved vertically on the wire 211 rather than horizontally, and a slide stop collar 216 is provided on the wire 211 to form a support for the line square 10. A set screw 217 threaded through the stop collar 216 permits the stop collar 216 to be clamped at any adjusted position along the guide wire 211.

The feet 21 in addition to supporting the line square 10 may also be used to engage a wall or other object to then align distant points therewith.

To align the line square 10 with the supporting line 11 to assure that accurate angles are obtained, the theodolite when used is rotated to be aligned with the far post and wire and its vertical hair is set over the wire where it attaches to the post. At this range, about 100', one can see almost one-half the post even with a powerful theodolite. With a rifle scope 39 seated in the parallel groove 32 of the alignment plate 25, the cross hair of the scope is aligned with the wire. Then when the scope is placed in one of the remaining grooves it will be accurately directed in the 90° or 45° angle.

Having thus described the preferred embodiments of the invention, it should be understood that numerous structural modifications and adaptations may be resorted to without departing from the spirit of the invention.

What is claimed is:

1. A line square for laying out structures from a taut guide line positioned adjacent the area to be laid out, comprising a yoke supporting said guide line in vertically extending relation, a tripod secured to said yoke for supporting said yoke thereon, a sight positioned adjacent said guide line and extending angularly thereto, a support connected to said sight and having means for engaging said guide line to align said sight with said guide line, and means on said support for holding said support in snug engagement with said guide line for sliding movement therealong.

2. A device as claimed in claim 1 including a vertically adjustable stop collar on said line for supporting said line square.

3. A device as claimed in claim 1 including a pair of transverse levels secured to said yoke for vertically aligning said line.

4. A line square for laying out structures from a taut guide line positioned adjacent the area to be laid out, comprising a sight positioned adjacent said guide line and extending angularly thereto, an elongated channel support for said sight having means for engaging said guide line to align said support with said guide line, means on said support for holding said support in snug engagement with said guide line for sliding movement therealong, a removable and replaceable circular alignment plate seated on the upper surface of said channel support, means for positioning said alignment plate on said channel support such that its center overlies said guide line when said engaging means are in contact with said line, and means for securing said sight to said alignment plate and said channel support at a desired angular orientation with respect to said guide line including a plurality of V-grooves extending diametrically across the upper face of the alignment plate and angularly related to each other and a bar adjustably secured in one of said V-grooves for securement to said sight.

5. A device as claimed in claim 4, wherein said bar is a tube having a central depending screw which passes through a central bore in said alignment plate and a bore in said elongated channel support, said tube having a rectangular member integrally secured to the upper surface thereof, and means is provided for clamping a telescopic sight to said rectangular member.

6. A device as claimed in claim 4, wherein said elongated channel support is provided at each end with a pair of downwardly disposed legs aligned transversely of said channel member with an opening therebetween, said means for engaging the guide line comprising bearing members seated in said openings between each pair of legs and each being formed to provide an inverted V-shaped notch for receiving the guide line in underlying alignment with the axis of the channel support.

7. A device as claimed in claim 6, wherein said legs each terminates at its lower end in an outwardly projecting foot portion having a horizontal bottom surface for supporting the sight on a flat surface away from said guide line.

8. A device as claimed in claim 6 wherein said means on said support for holding said support in snug engagement with said line includes a pair of coil spring members detachably secured to opposite ends of said support for engaging beneath said guide line and urging said line towards said means for engaging said guide line.

9. A device as claimed in claim 6 wherein an L-shaped hook opening is formed in one leg of each of said pairs of legs on one side of said line to engage said line and support said square when out of use.

10. A line square for laying out structures from a taut guide line positioned adjacent the area to be laid out, comprising a sight positioned adjacent said guide line and extending angularly thereto, an elongated channel support for said sight having means for engaging said guide line to align said support with said guide line, means on said support for holding said support in snug engagement with said guide line for sliding movement therealong, a removable and replaceable circular alignment plate seated on the upper surface of said channel support, means for positioning said alignment plate on said channel support such that its center overlies said guide line when said engaging means are in contact with said line, and means for securing said sight to said alignment plate and said channel support at a desired angular orientation with respect to said guide line, said means for securing the sight to said circular alignment plate and channel support including a plurality of V-grooves extending diametrically across the upper face of the alignment plate and angularly related to each other and, an externally threaded cylindrical member having a dependent axial bolt and a plurality of dependent dogs and being mounted on said alignment plate, said axial bolt passing through a central bore in said alignment plate and a bore in said elongated channel support, and said dogs engaging in one of said V-grooves, and said sight being a surveyor's transit which is threaded onto said cylindrical member.

* * * * *